United States Patent
Piovesan

(10) Patent No.: US 6,744,160 B2
(45) Date of Patent: Jun. 1, 2004

(54) DEVICE FOR CONNECTING AND INSULATING A THERMAL PROTECTOR FOR ELECTRICAL WINDINGS OF MOTORS

(75) Inventor: Gianni Piovesan, Cadoneghe (IT)

(73) Assignee: Inarca S.p.A., Vigodarzere (IT)

( * ) Notice: Subject to any disclaimer, the term of this patent is extended or adjusted under 35 U.S.C. 154(b) by 0 days.

(21) Appl. No.: 10/258,129

(22) PCT Filed: Feb. 25, 2002

(86) PCT No.: PCT/EP02/01952

§ 371 (c)(1),
(2), (4) Date: Oct. 21, 2002

(87) PCT Pub. No.: WO02/071579

PCT Pub. Date: Sep. 12, 2002

(65) Prior Publication Data

US 2003/0060093 A1 Mar. 27, 2003

(30) Foreign Application Priority Data

Mar. 1, 2001 (IT) ..................................... PD20010016 U

(51) Int. Cl.⁷ ............................. H02K 11/00; H02K 5/22
(52) U.S. Cl. ...................................... 310/68 C; 310/71
(58) Field of Search ................................ 310/68 C, 71; 361/22, 23, 25; 337/380, 381

(56) References Cited

U.S. PATENT DOCUMENTS

| | | | | |
|---|---|---|---|---|
| 3,959,675 A | * | 5/1976 | Lautner et al. | 310/68 C |
| 4,467,385 A | * | 8/1984 | Bandoli et al. | 361/24 |
| 5,615,071 A | * | 3/1997 | Higashikata et al. | 361/22 |
| 5,903,418 A | * | 5/1999 | Boivin et al. | 361/22 |
| 6,317,304 B1 | * | 11/2001 | De Campos | 361/22 |
| 6,326,879 B1 | * | 12/2001 | Hangmann et al. | 337/381 |

FOREIGN PATENT DOCUMENTS

| | | | | |
|---|---|---|---|---|
| EP | A-0 431 238 | 6/1991 | | H02K/11/00 |
| EP | A-0 548 610 | 6/1993 | | H02K/11/00 |
| EP | A-0 603 478 | 6/1994 | | H02K/5/22 |
| EP | A-0 727 864 | 8/1996 | | H02K/3/50 |

* cited by examiner

Primary Examiner—Burton Mullins
(74) Attorney, Agent, or Firm—Guido Modiano; Albert Josif; Daniel O'Byrne

(57) ABSTRACT

A device for connecting and insulating a thermal protector for electrical winding of motors, comprising a tray-like shell made of a plastic material, which contains the protector and is provided with one or more terminals for electrical contact with the power supply of the motor to which it is applied; the contacts protrude from the shell, which has one or more tabs and locators which are applied by anchoring, in suitable and complementary regions of the spools of the windings of the motor enclosed in a plastic cover.

7 Claims, 6 Drawing Sheets

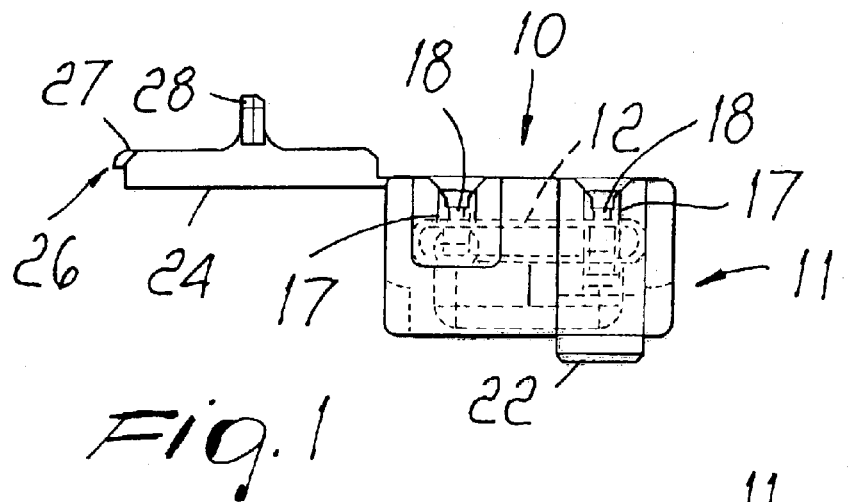
Fig. 1
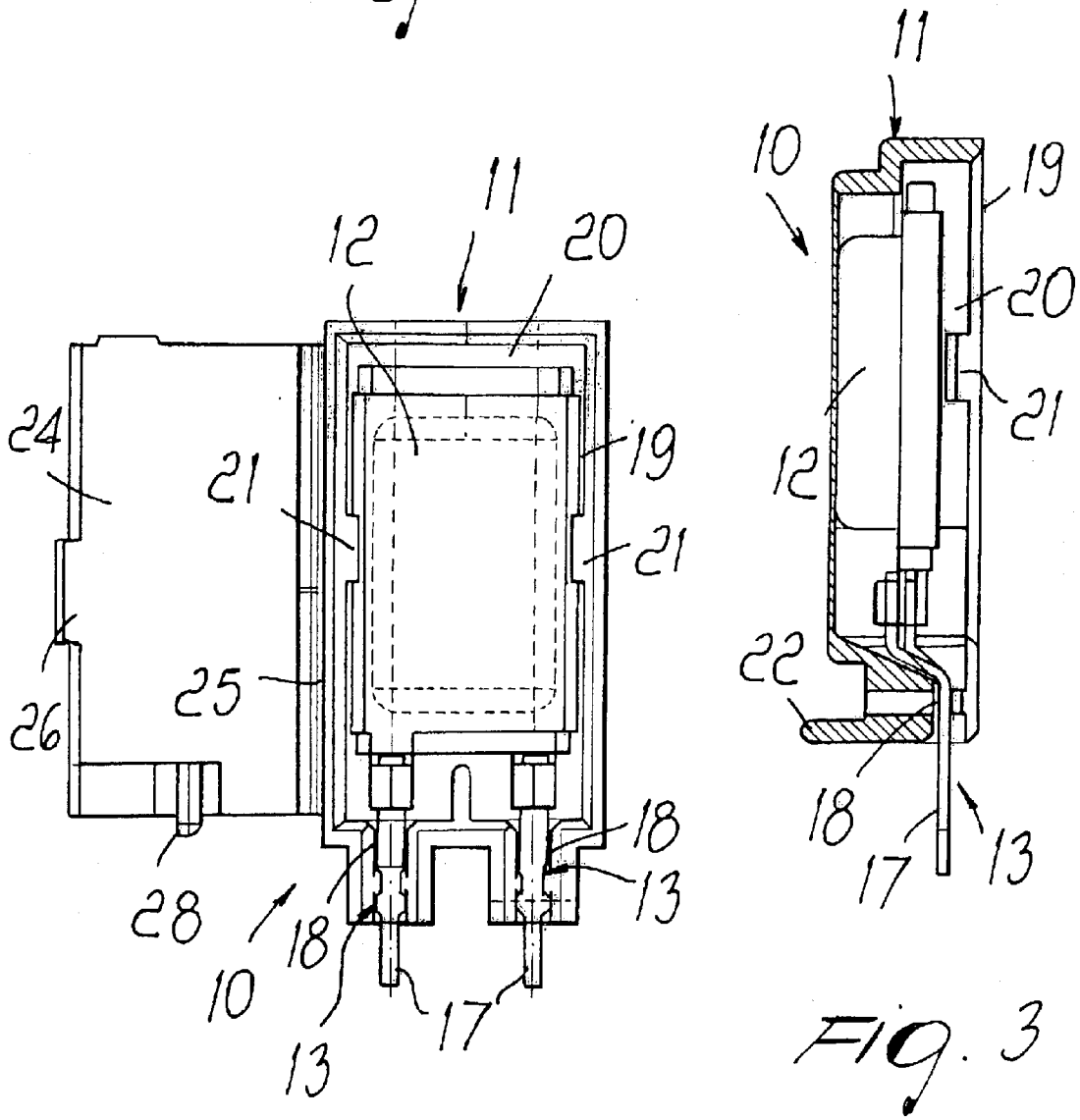
Fig. 2
Fig. 3

DEVICE FOR CONNECTING AND INSULATING A THERMAL PROTECTOR FOR ELECTRICAL WINDINGS OF MOTORS

BACKGROUND OF THE INVENTION

The present invention relates to a device for connecting and insulating a thermal protector for electrical windings of motors.

It is known that in the mass-production of electric motors, manufacturers have a growing need to automate their processes in order to achieve considerable economies of scale.

However, this need clashes with the fact that in the electrical field many technologically developed countries have rather restrictive standards in order to ensure the quality and safety of the product.

Accordingly, the need to combine high quality and safety with large production runs induces operators in this field to develop solutions aimed at assembling components on automatic machines.

In particular, one very important component of the protection means of an electric motor is the thermal protector and particularly its connection and insulation.

The thermal protector is substantially constituted by a component that is sensitive to the temperature variations of the windings of the motor and ensures that said windings, once a preset temperature has been reached, are disconnected from the contacts to the electric power supply.

The thermal protectors currently applied to motors are substantially connected by means of clinched or soldered wires which are then insulated by means of heat-shrink sheaths and positioned manually, and therefore it is necessary to provide a specialized operator dedicated to the wiring and to assembling said thermal protector.

SUMMARY OF THE INVENTION

The aim of the present invention is to provide a device for connecting and insulating a thermal protector for electrical windings of motors that ensures automated assembly without however sacrificing the safety and quality assurances of the final product.

Within this aim, an important object of the present invention is to provide a device for connecting and insulating a thermal protector that ensures complete absence of significant interference regarding the properties of detection and sensitivity to thermal variations of the winding.

Another object of the present invention is to provide a device for connecting and insulating a thermal protector whose structure ensures high flexibility of application as regards both the shape and size.

Another object of the present invention is to provide a device for connecting and insulating a thermal protector whose structure also allows application to motor types that are already in production and have already been developed.

Another object of the present invention is to provide a device for connecting and insulating a thermal protector whose structure allows its easy replacement in case of malfunction and allows to manufacture it through known technologies and systems.

This aim and these and other objects that will become better apparent hereinafter are achieved by a device for connecting and insulating a thermal protector for electrical winding of motors, characterized in that it comprises a tray-like shell made of a plastic material which contains the protector and is provided with one or more terminals for electrical contact with the power supply of the motor to which it is applied, said contacts protruding from said shell, said shell having one or more tabs and locators which are adapted to be applied by anchoring, within suitable and complementary regions of the spools of the windings of the motor enclosed in a plastic cover.

BRIEF DESCRIPTION OF THE DRAWINGS

Further characteristics and advantages of the invention will become better apparent from the description of an embodiment thereof and of various applicative situations, illustrated only by way of non-limitative example in the accompanying drawings, wherein:

FIG. 1 is a partially sectional orthographic projection view of a device for connecting and insulating a thermal protector having the structure according to the invention;

FIGS. 2 and 3 are two orthographic projection views of the device of FIG. 1;

DESCRIPTION OF THE PREFERRED EMBODIMENTS

Figure 4:
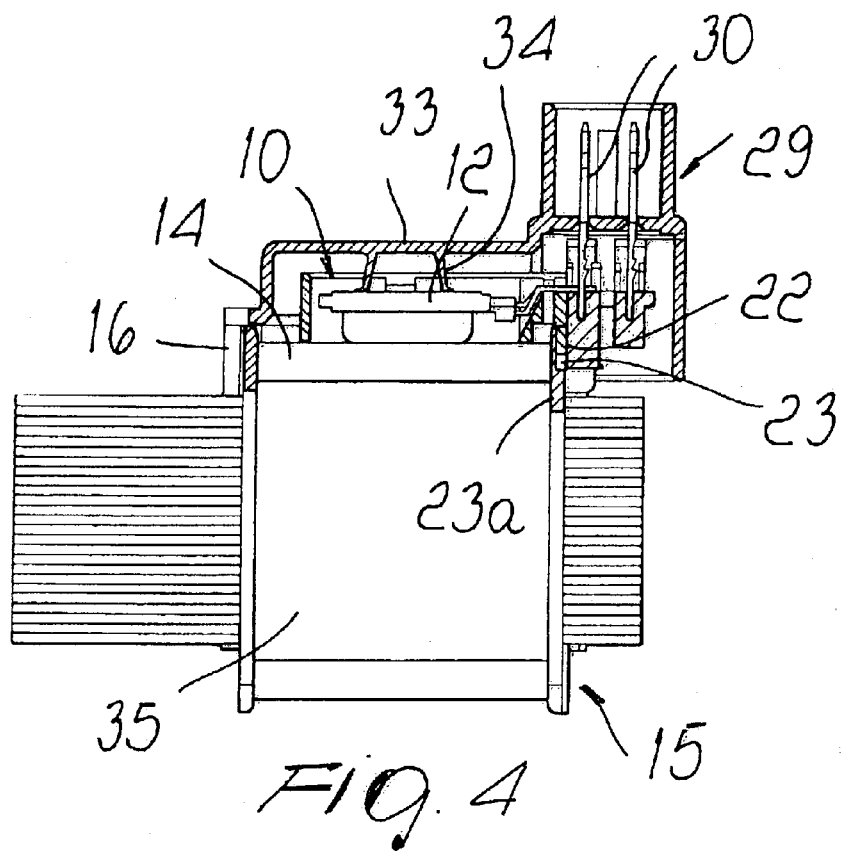
FIGS. 4 and 5 are two partially sectional orthographic projection views of the device of FIG. 1 in a particular applicative situation.

With particular reference to FIGS. 1 to 3, a device for connecting and insulating a thermal protector for electrical windings of motors having the structure according to the invention is generally designated by the reference numeral 10.

The device 10 comprises, within a rigid tray-like shell 11 made of plastics, a thermal protector 12 (a component that is sensitive to temperature variations), which has, in this case, two terminals 13, described in greater detail hereinafter, for electrical contact with the power supply of the electric motor 15, as specified in greater detail hereinafter, which protrude from the shell 11.

The shell 11 has, in this case, positioning tabs and locators, as described in greater detail hereinafter, which are suitable to be applied in anchoring within suitable and complementary portions of the plastic cover 16 of the motor 15.

The shell is conveniently placed in contact with the windings 14, so that the thermal protector 12 is adjacent thereto and can detect its temperature.

In this embodiment, the electrical contact terminals 13 are constituted by a corresponding number of laminas 17 that protrude from the shell 11 and are partially accommodated and rest in suitable channels 18 formed in said shell 11.

The shell 11 is shaped, at the edge 19 related to the access opening designated by the reference numeral 20, so as to form in this case two elastic cantilevered tongues 21 for reversible locking of the thermal protector 12.

In this embodiment, said tabs are constituted by a tooth 22 which protrudes from said shell 11 in the vicinity of said electrical contact terminals 13 and substantially at right angles to the arrangement of the thermal protector 12; said tooth is suitable to enter an appropriately provided seat 23 formed in a head 23a of the spool 35 for the windings 14 of said electric motor.

In this embodiment, the device 10 is further provided with a cover 24 for the reversible closure of the shell 11.

In particular, the cover 24 is substantially monolithic with the shell 11, to which it is pivoted with a side-hinged movement by way of a longitudinal flexible articulation portion 25.

The cover 24 also has a coupling 26 for reversible engagement with a locking tooth 27.

The cover 24 has a centering locator 28.

In particular, the described embodiment is particularly useful for motors intended for example for vacuum cleaners.

In motors intended for example for application in pumps it is instead better to provide the solution without a cover.

Figure 5:
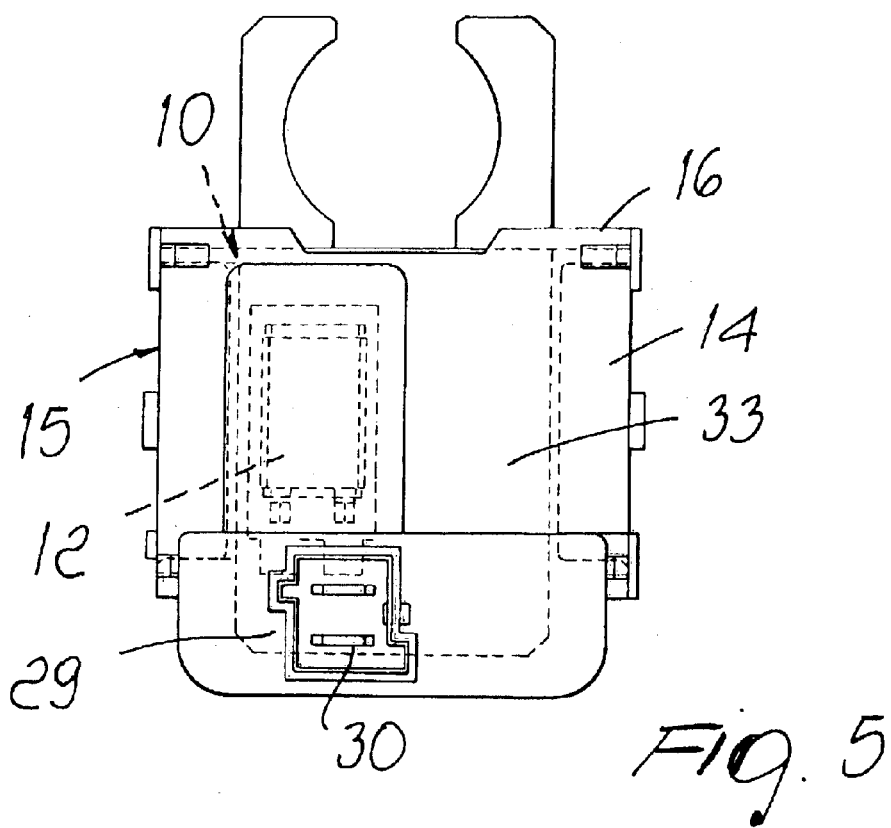

With particular reference to FIGS. 4 and 5, the device 10 is applied to an electric motor 15, which is provided with a particular connector 29 (in a plastic cover 33), which accommodates electrical terminals 30 for connection to the windings 14.

In particular, the figures show the position of the protector 12, which is substantially perpendicular to the electrical terminals 30, to which it is connected by means of the laminas 17.

In this case, the cover 33 of the motor 15 has feet 34, which keep the thermal protector 12 pressed against the bottom of the shell 11.

Figure 6:
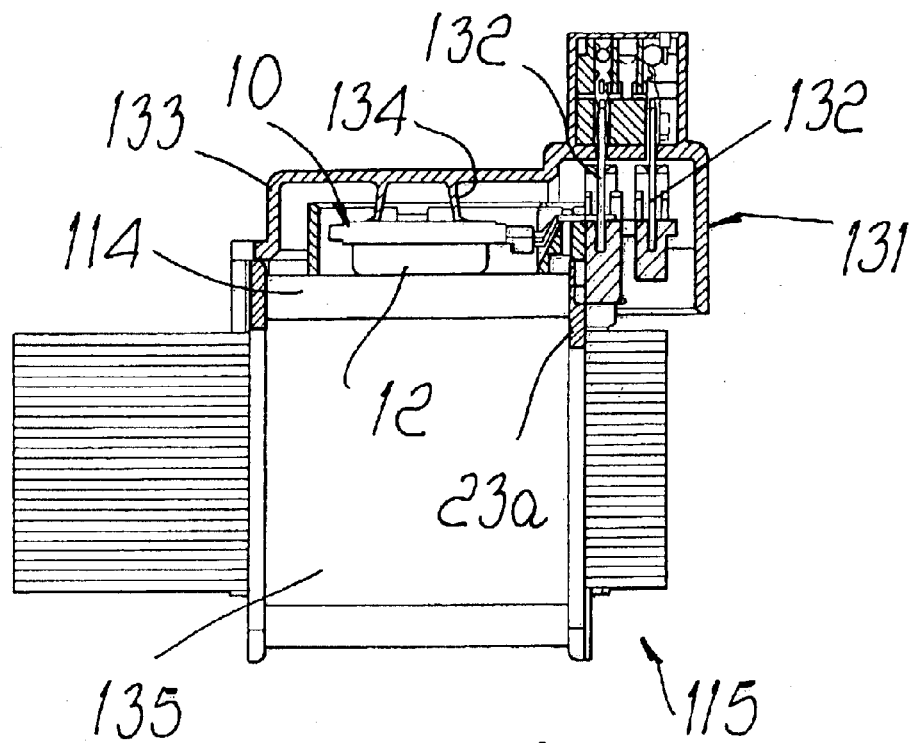
FIGS. 6 and 7 are two partially sectional orthographic projection views of the device of FIG. 1 in another applicative situation.
Figure 7:
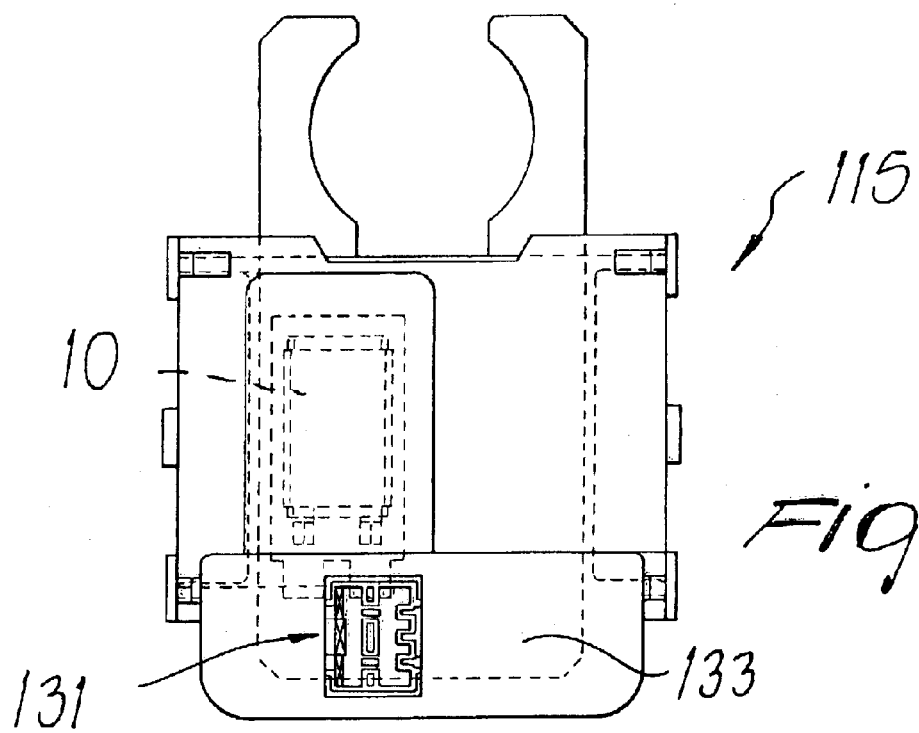

The application of a device 10 in a motor generally designated by the reference numeral 115 is described with particular reference to FIGS. 6 and 7.

Here, too, attention is called to the particular configuration of the connection between the protector 12 and, inside a connector 131 of the cover 133, electrical terminals 132 for connection to the windings 114.

In this case, the cover 133 of the motor 115 has feet 134, which keep the sensor element 12 pressed against the bottom of the shell 11.

Figure 8:
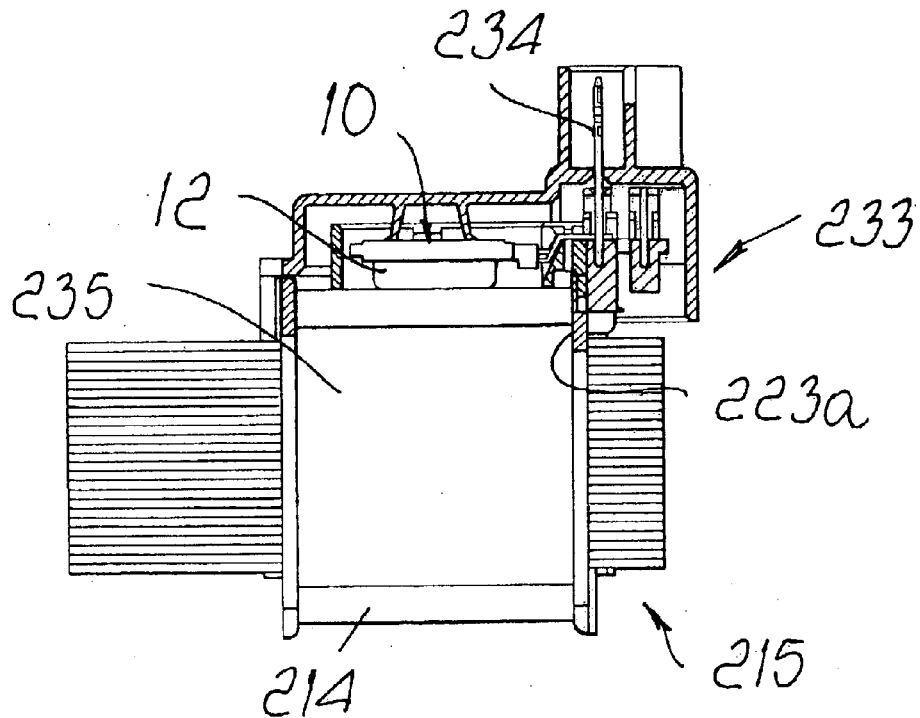
FIGS. 8 and 9 are two partially sectional orthographic projection views of the device in yet another applicative situation.
Figure 9:
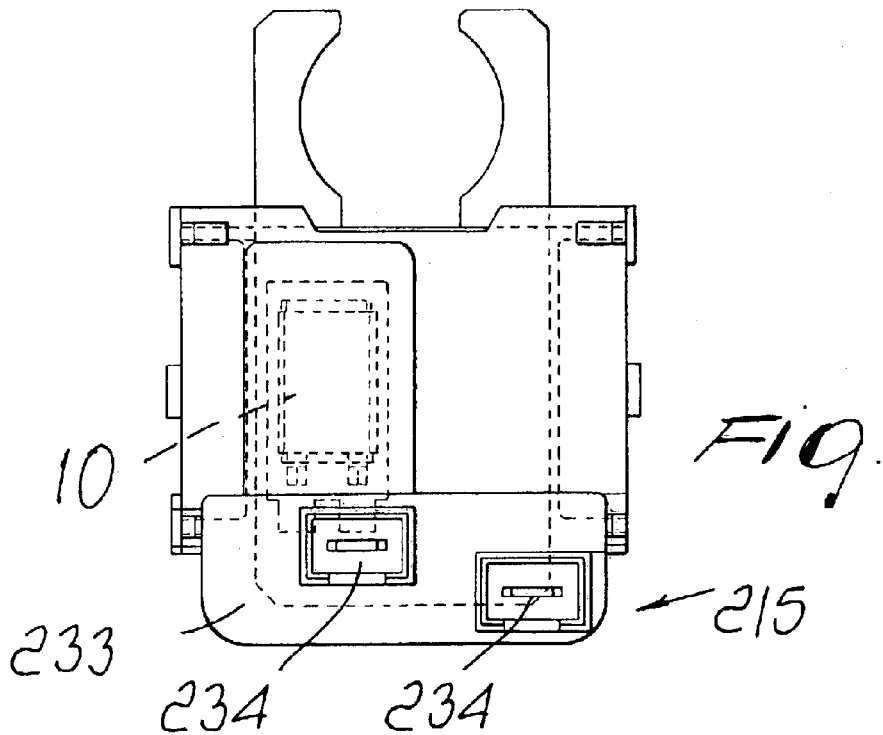

The application of a device 10 to an electric motor 215 is described with particular reference to FIGS. 8 and 9.

In particular, the above cited figures show the particular shape of the connection between the protector 12 and, within a particular connector 233, electrical terminals 234 for connection to the windings 214.

Figure 10:
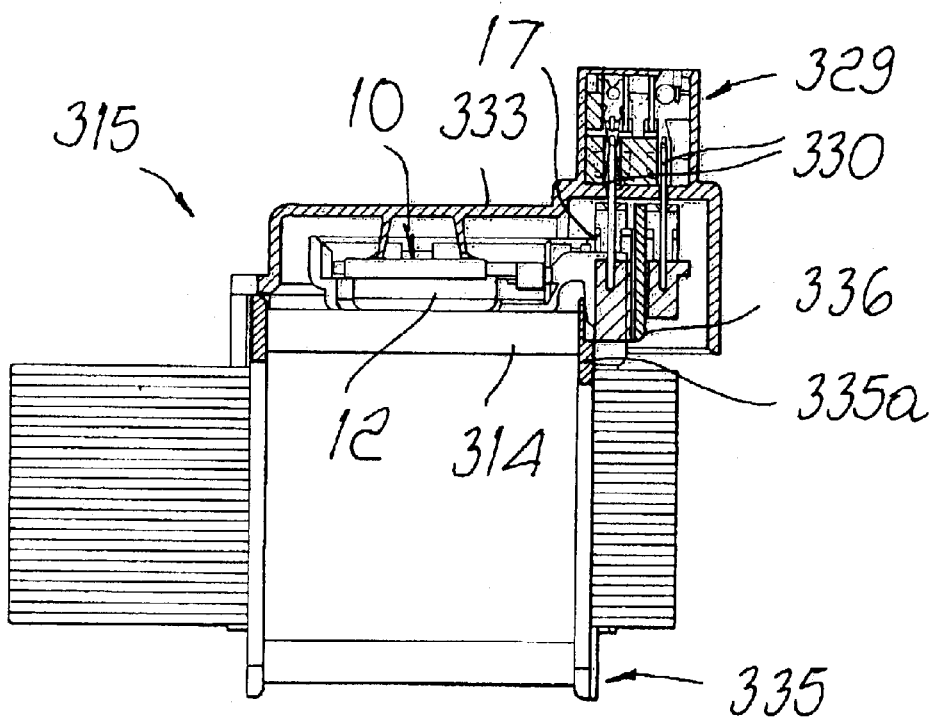
FIGS. 10 and 11 are two partially sectional orthographic projection views of the device in yet another applicative situation.
Figure 11:
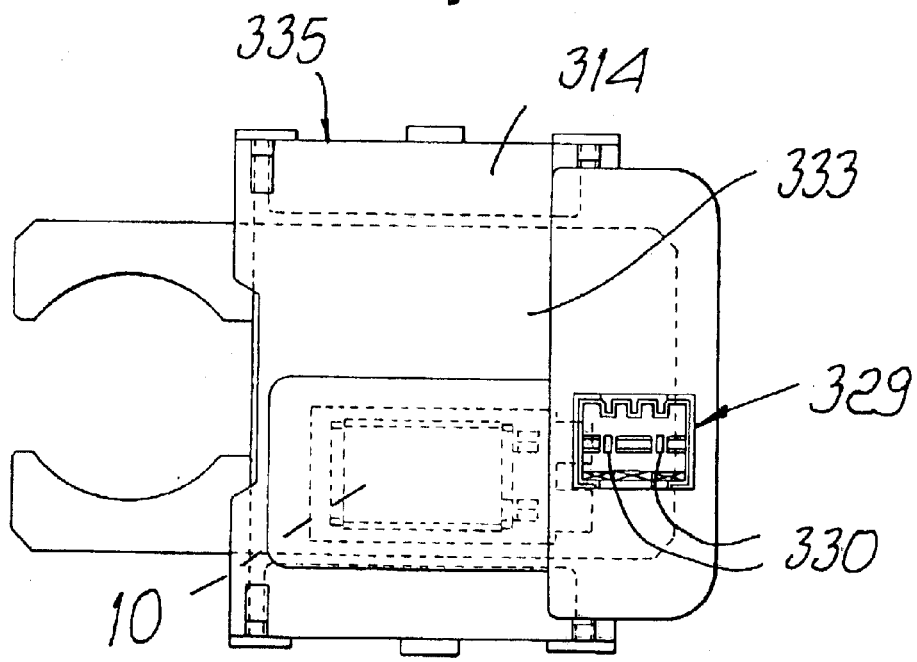

With particular reference to FIGS. 10 and 11, the device 10 is applied to an electric motor 315 that has a connector 329 (in a cover 333 made of plastics) that accommodates electrical terminals 330 for connection to the windings 314.

The protector 12 is substantially perpendicular to the electrical terminals 330, to which it is connected by means of the laminas 17.

Figure 12:
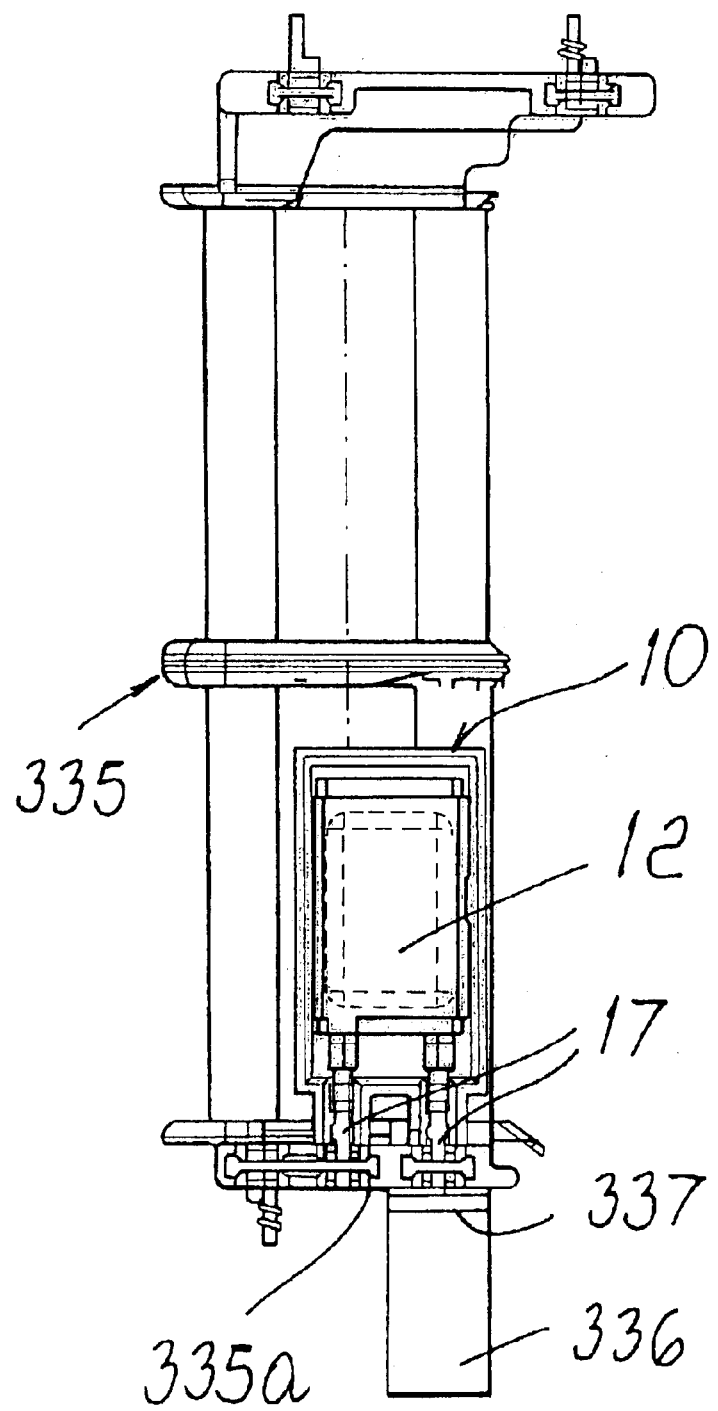
FIG. 12 is a view of a component of FIGS. 10 and 11.

FIG. 12 illustrates the spool 335, which is arranged in a configuration suitable for the winding of the windings 314 of the motor 315.

A plate-like wing 336 protrudes monolithically at the head 335a of the spool 335; said wing is normally parallel to the protector 12 and lies below the laminas.

The wing 336 can be folded so as to be parallel to the electrical terminals 330 because it is connected to the head 335a by means of a film hinge 337.

When the wing 336 is folded so as to be parallel to the terminals 330 and the spool 335 is arranged in the active configuration, said wing is interposed between said electric terminals 330, as shown in FIG. 10, preventing any short-circuit contacts thereof due to the laminas 17 that protrude from the protector 12.

The presence of the wing 336 is particularly important when the electrical terminals (30, 130, 330) are substantially aligned with the direction of extension of the laminas 17.

In practice it has been found that the present invention has achieved the intended aim and objects.

It is in fact noted that despite the constructive simplicity of the structure of the device according to the invention, a high capacity for automation, even mass automation, is provided without detracting from the safety of the positioning and connection of said protector.

The assembly of the protector is in fact substantially guided and substantially free from possibilities of assembly errors owing to its structure.

It should also be noted that the particular structure of the protector allows to place said protector in an optimum situation for detecting effectively the temperature variations of the winding.

It is also noted that the structure of the shell of the thermal protector allows high flexibility of application both in terms of shape and in terms of size in relation to the motor for which it is intended.

Finally, it should be noted that the structure of the device according to the invention allows easy and immediate replacement without particular technical expertise on the part of the operator.

The present invention is susceptible of numerous modifications and variations, all of which are within the scope of the appended claims.

The technical details can be replaced with other technically equivalent elements.

The materials and the dimensions may be any according to requirements.

The disclosures in Italian Utility Model Application No. PD2001U000016 from which this application claims priority are incorporated herein by reference.

What is claimed is:

1. A device for connecting and insulating a thermal protector for electrical windings of motors, comprising a tray-like shell made of a plastic material, which contains the protector and is provided with one or more terminals for electrical contact with the power supply of a motor to which it is applied, said one or more terminals protruding from said shell, said shell having one or more tabs and locators which can be fixed within complementary regions of the spool of the windings of the motor enclosed in a plastic cover wherein said one or more electrical contact terminals are constituted by a corresponding number of rigid and spaced apart laminas preventing any short-circuit contacts, said laminas protruding from said shell and being partially accommodated and rested in channels formed in said shell.

2. The device according to claim 1, wherein said shell is shaped, at the edges related to an access opening, so as to form one or more elastic cantilevered tongues for the locking and unlocking of said thermal protector, said cantilevered tongues being directed towards the inside of said shell.

3. The device according to claim 1, wherein said one or more tabs are constituted by a tooth which protrudes from said shell in the vicinity of said electrical contact terminals and substantially at right angles to the surface of the shell containing said thermal protector to be fixed on said electric motor, said tooth being adapted to enter a seat formed in a head of the spool for the windings of said electric motor.

4. The device according to claim 1 further comprising a cover provided with a locking tooth for closing and unclosing said shell, wherein said cover is provided with a protruding centering locator.

5. The device according to claim 1, wherein a cover of the motor has feet which keep said thermal protector pressed against the bottom of said shell without a cover.

6. The device according to claim 1, further comprising a plate-like wing which protrudes monolithically from said head of the spool and is arranged so as to be interposed between said electric terminals so as to prevent any short-circuit contacts thereof by said laminas that protrude from said protector.

7. The device according to claim 6, wherein said wing is normally arranged parallel to said protector, below the laminas, and can be folded parallel to said electrical terminals being connected to the head by way of a film hinge.

* * * * *